Jan. 2, 1923.
G. G. BARRY.
METAL WHEEL.
FILED OCT. 8, 1920.
1,440,435
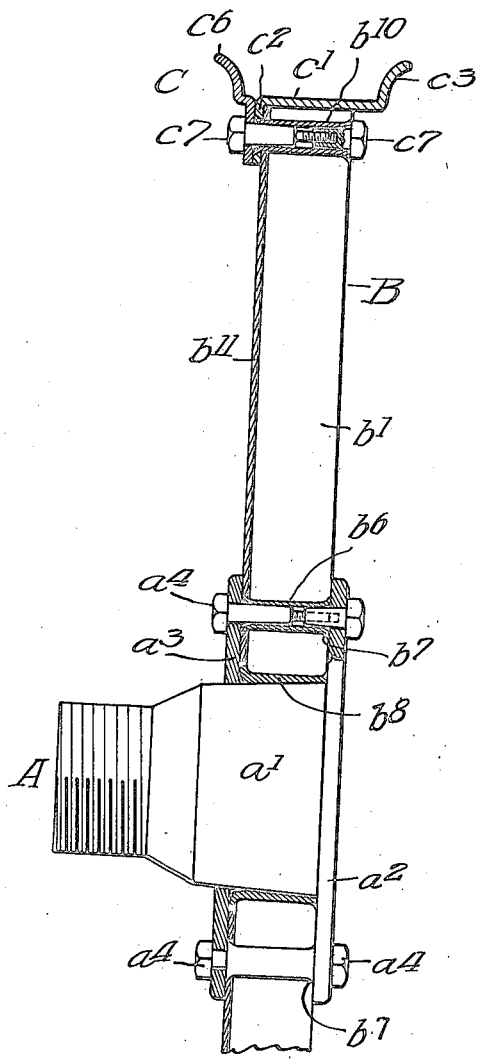
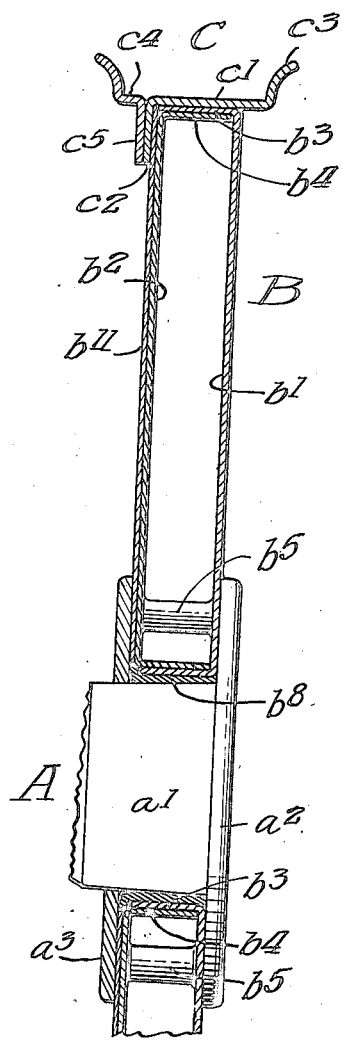

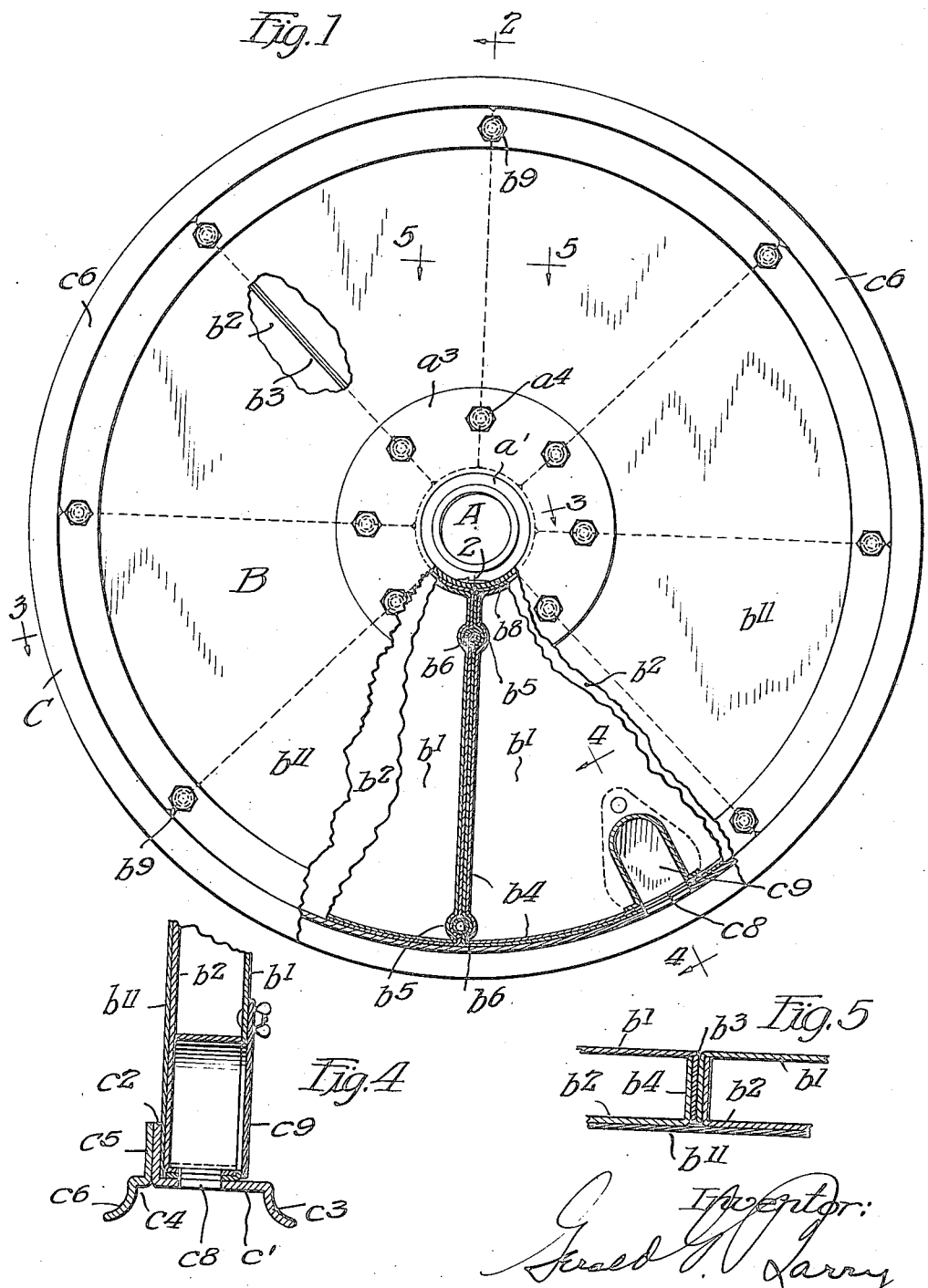

Patented Jan. 2, 1923.

1,440,435

UNITED STATES PATENT OFFICE.

GERALD G. BARRY, OF CHICAGO, ILLINOIS.

METAL WHEEL.

Application filed October 8, 1920. Serial No. 415,511.

*To all whom it may concern:*

Be it known that I, GERALD G. BARRY, a citizen of the United States, and a resident of Chicago, in the county of Cook and State of Illinois, have invented certain new and useful Improvements in Metal Wheels, of which invention the following is a specification.

The present invention relates principally, but not exclusively, to wheels for automobiles, wherein the supporting structure between the hub and rim members is formed from sheet metal. The per pound capacity of a relatively thin sheet metal plate when placed on edge to withstand enormous load strains is well known, but in vehicle wheels the danger from the severe twisting or lateral strains is an important one to be considered and guarded against. The ordinary disc wheels frequently "buckle," and difficulty is also found at the fastening of the thin wall to the hub. The object of my invention is to overcome these practical conditions, and to provide a wheel which is light in weight, yet capable of withstanding severe driving stresses, is of very pleasing appearance, but simple and low in cost of construction, and having other advantages which will be apparent to the manufacturers and users of such wheels.

In the accompanying drawings, forming part of this specification, like letters or marks of reference are used to designate similar parts throughout the several figures.

Fig. 1 is a side elevation of the new wheel, portions being broken away exposing certain details to permit of explanatory reference; Fig. 2 is a transverse view on the arrowed line 2—2 of Fig. 1; Fig. 3 is a transverse section on the arrowed line 3—3 of Fig. 1; the main hub body, however, not being sectionized in either Fig. 2 or Fig. 3. Fig. 4 is a detail section view, showing the housing for tire valve; and Fig. 5 is a detail cross-section, indicated by the arrows 5—5 in Fig. 1, illustrating assembly features.

The hub member, generally speaking, is designated by A. The hub in connection with which the new structure is here illustrated may be recognized as an ordinary form of automobile front wheel hub, but, of course, any other suitable hub or shaft member may be employed. In the hub shown $a^1$ is the main hub body; $a^2$ denotes the customary integral flange extending outwardly from and following circumferentially around the inner end of the main hub body; and $a^3$ is a removable flat ring or clamping plate, between which and the integral flange $a^2$ the new rim supporting structure (taking the place of the felly, spokes and nave of an ordinary wheel) to be presently described, is secured in place upon the central hub body by the bolts or other fastening means $a^4$.

Element B, the new supporting structure between the hub A and rim member C, will now be described. The main body is composed of a plurality of telescoped substantially sector shaped "boxes," preferably drawn from sheet metal, the wheel illustrated in Fig. 1 showing the body divided into eight such sector shaped units. Each such box also preferably consists of two complemental members, as shown, one being formed just sufficiently smaller than the other that the flanged sides of the two can be telescoped together. For distinction, $b^1$ here marks the outer telescoping member, and $b^2$ the inner complemental member. These are exactly alike in outline, except that one is slightly smaller than the other, as already mentioned. When assembled, the series $b^1$ $b^2$ form the equivalent of two discs, parallel but spaced apart, and I prefer in a plane at right angles to the axis, although same may be curved or tapered toward the hub. The original blank from which each of the sector shaped members $b^1$ and $b^2$ are formed is sufficiently large so that an integral flange is drawn or struck over from each. For distinction, the flange on the face $b^1$ is marked $b^3$ and that on the opposite member $b^2$ is marked $b^4$. These integral flanges $b^3$ and $b^4$, it will be observed, follow continuously around the sector shaped outline of their respective sections. Of course in instances where the hub or shaft fitting is very small, the inner portion of the flange, conforming to the outer face of the hub body $a^1$, might be eliminated, and the side flanges carried nearer to a point, and thus giving more perfectly the true outline of a sector. The depth of these flanges $b^3$ and $b^4$ preferably corresponds to the width of an ordinary spoke or nave, so that when the flange $b^4$ is forced within the flange $b^3$ there is a double thickness of the sheet metal around the outline of the entire sector shaped members, and extending substantially across the spaced distance between the parallel faces $b^1$ and $b^2$.

The sector shaped box units are secured as follows: Near the hub end the face plates and the flanges are indented or formed so as to provide a half round channel $b^5$, which matched up with the corresponding channel on the adjacent member, forms a circular opening through the body, adapted to receive the fastening means, and makes unnecessary drilling for the purpose and at the same time gains the strength afforded by the double thickness of flange wall. In each of the series of openings I also prefer to insert a ferrule or tube, $b^6$, one end of which may be provided with a flange $b^7$, and after being inserted the opposite extended end is swedged over to form a like flange and thus secure the adjacent members at this point from shifting laterally. The hub flange $a^3$ may be dispensed with, or if retained, as illustrated, the flanged ferrule $b^6$ may extend through the removable hub flange $a^3$, although not so illustrated, and thus secure it to the supporting body, but it will be noticed the flanged ferrule or tube $b^6$ does not extend through the fixed hub flange $a^2$ as the supporting body is adapted to be readily removed from the hub without disturbing the flanges $b^7$. The whole body is detachably secured to the hub member by the series of bolts and nuts $a^4$. I prefer to provide these bolts with enlarged tapered shanks, one provided with the male and the opposite side with the female thread, and as the two are drawn together the tapered shanks wedge more tightly against the outer edges.

I also prefer to provide the central hub receiving opening formed by the lower or inner flanged wall of the assembled sector box units, with a somewhat similar flanged ferrule, here marked $b^8$, to further assist in securing the body at the center, the inner part of this central ferrule $b^8$ being tapered, and the hub face $a^1$ correspondingly tapered, to facilitate the attachment or withdrawal of the rim supporting body from the hub member. I also contemplate other methods of securing this supporting structure to the hub.

The face plates and flanges also may be similarly indented or formed near the periphery with a half round channel, matching with a corresponding half round channel in the adjacent member, to provide the circular openings, here marked $b^9$ and in such openings the flanged tubes or ferrules $b^{10}$. The flanges on the ferrules serve to secure the members against disengagement at the outer edge, and may also extend beyond the inwardly directed flange on the rim member and assist in securing the rim, as presently to be described.

An outer finishing plate or disc $b^{11}$ may be provided and be clamped against the assembled series of telescoped boxes, which form the main supporting body. Of course, this disc $b^{11}$ will also serve some as a strengthening means, but I prefer to depend for strength more upon making the telescoped members of a suitable gauge of sheet steel, and to galvanize and otherwise treat same to better guard against rust, and where desired for appearances to cover the slight parting line between abutting members, to make use of the additional disc $b^{11}$, which can very well be aluminum, copper or other metal. If this disc $b^{11}$ is dispensed with, I would employ the plates $b^1$ and integral flange $b^3$ on the outer face of the wheel, which will show only a simple parting line between the adjacent sector shaped members, and expose the double flange edges on the inside of the wheel.

C denotes the rim element. As the new wheel was devised primarily for automobiles the drawings illustrate my preference in this connection, although it will be obvious that other forms of rims may be employed. In Fig. 2 and Fig. 3 the transverse sections show a rim band $c^1$ directly fitted upon the flanges of the supporting body B. This band $c^1$ has an inwardly directed integral flange $c^2$ extending down and closely fitting against the face of the supporting body, and also an outwardly directed and flaring flange $c^3$ on the opposite edge. The flanged ferrules $b^{10}$ may extend through the rim flange $c^2$ and serve to secure this part of the rim element to the supporting body B. A further band $c^4$, having an inwardly directed straight flange $c^5$, and an outwardly flaring flange $c^6$, is also provided, and the flange $c^5$ is detachably secured against the flange $c^2$ and the supporting structure as shown by means of a series of bolts and nuts $c^7$, similar to the central bolt members $a^4$, and operating much the same as demountable rims are ordinarily secured upon a wheel, except that in the case of the rim illustrated here the entire rim is not demounted. The cross-section of rim shown will be readily recognized as one suitable for a "straight side" pneumatic tire, (not here shown). A tire can be mounted or removed by detaching the outer band and flange $c^5$, and the whole supporting body can be readily attached or detached also at the hub.

Referring more particularly to Fig. 4, and Fig. 1, an opening $c^8$ is provided through the rim and flanges of the supporting member, to receive the valve of the pneumatic tire, and preferably in the inside of the wheel this plate $b^1$ is formed to provide a valve housing. A suitable swinging shutter $c^9$ is provided to keep out dirt and the like; and a reinforcing strip at the rim may be provided under the rim at the valve opening.

The snugly telescoped relation of the flanges of the sector shaped box units should be carefully noted in the several figures of the drawings. It will be observed there is thus provided in the assembled wheel a double thickness of metal following circumferentially under and supporting the rim member; in fact, comprising a rim in itself; and where the radius line walls of adjacent units abut when assembled there is also provided a "spoke" of four thicknesses of metal to supplement the "discs" $b^1$ and $b^2$ in supporting the rim C upon the hub A. These flanges following the outline of each sector unit, however, perform very important functions in resisting any possible lateral strains or side thrust. The main drawbacks found with so-called disc wheels on automobiles is the difficulty of fastening to the hub and the great danger of "buckling." It will be apparent that by my design with the use of a relatively thin and light weight sheet a wheel structure constructed and assembled as herein shown will have the capacity to withstand severe side thrust as well as other driving stresses, and the advantages of its hub fastening over the ordinary disc wheel will be obvious.

It will be apparent that various changes may be made in the wheel herein chosen for illustration without departing from the spirit and scope of the invention, and I do not wish any undue limitation to result from the detailed description given, but desire the claims appended hereto to be construed as broadly as possible in view of the prior art relating to such wheels.

What I claim as new and desire to secure by Letters Patent is the following:

1. In a wheel, included as a support between the hub and rim members, a structure consisting of a plurality of substantially sector shaped hollow metal units, comprising the complemental pair of boxes, formed, telescoped and assembled substantially as set forth.

2. In a wheel of the character described, the hollow metal supporting units, each comprising substantially a sector of the supporting structure between the hub and rim members, formed from sheet metal and having integral therewith a flange following continuously around the sector outline, substantially as shown and described.

3. In a wheel of the character described, the hollow metal box units comprising substantially a sector of the supporting structure between the hub and rim, formed from sheet metal, each having integral therewith a flange following continuously around the sector outline, and a similarly formed but slightly smaller substantially sector shaped member telescoped within the other, substantially as shown and described.

4. In a wheel of the character described, as a supporting body between the hub and rim members, a plurality of hollow metal units, each consisting of a main face plate having substantially a sector outline abutting each of said face plates having a flange at right angles thereto, extending substantially across the full width of the supporting body, and said integral flange following continuously around the sector, substantially as set forth.

5. In a wheel, the combination with a single metal disc, a series of abutting, substantially sector shaped supporting units, each unit comprising a main face plate set parallel with the single disc, and each of said sector shaped units provided with a flange following continuously around the sector outline of the respective units and extending across the width of the supporting structure, substantially as set forth.

6. In a wheel of the character described, the hollow metal units, each comprising in combination the sector shaped member $b^1$, having integral continuous flange $b^3$, sector shaped member $b^2$, spaced apart from member $b^1$ and having integral flange $b^4$, the said flanges extending substantially across the spaced distance between members $b^1$ and $b^2$ and being telescoped together, substantially as shown and described.

7. In a wheel of the character described, included as a support between the hub and rim members, a plurality of hollow metal sector shaped units, comprising the complemental pair of telescoped boxes, each drawn from a single blank so as to provide integrally the main sector face plate and flange following continuously around the sector outline of each box, all constructed and arranged substantially as shown and described.

8. In a wheel of the character described, included as a support between the hub and rim members, a plurality of sector shaped members $b^1$, each having an integral continuous flange $b^3$, and an outer single disc $b^{11}$ in abutting relation with the plurality of members $b^1$.

9. In a wheel of the character described, included as a support between the hub and rim members, a plurality of metal units, each comprising the sector shaped member $b^1$ and the continuous flange $b^3$, substantially as set forth.

In testimony whereof, I have hereunto signed my name to this specification.

GERALD G. BARRY.